United States Patent
Yang et al.

(10) Patent No.: US 11,662,515 B2
(45) Date of Patent: May 30, 2023

(54) LIGHT GUIDING DEVICE AND INDICATION APPARATUS

(71) Applicant: Wistron Corporation, New Taipei (TW)

(72) Inventors: Qi-Hong Yang, New Taipei (TW); Yen-Hsun Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/244,046

(22) Filed: Jan. 9, 2019

(65) Prior Publication Data

US 2020/0103579 A1 Apr. 2, 2020

(30) Foreign Application Priority Data

Sep. 27, 2018 (TW) .................................. 107134057

(51) Int. Cl.
*F21V 8/00* (2006.01)
*G02B 19/00* (2006.01)
*H01H 13/02* (2006.01)

(52) U.S. Cl.
CPC ......... *G02B 6/0046* (2013.01); *G02B 6/0035* (2013.01); *G02B 19/0028* (2013.01); *H01H 13/023* (2013.01)

(58) Field of Classification Search
CPC .... G02B 6/002; G02B 6/0046; G02B 6/0021; G02B 19/028; G02B 19/0028; G02B 6/0035; B60Q 3/10; B60Q 3/14; H01H 13/023
See application file for complete search history.

(56) References Cited

U.S. PATENT DOCUMENTS

| | | | |
|---|---|---|---|
| 6,193,383 B1* | 2/2001 | Oniki | F21V 13/04 362/23.15 |
| 2015/0003094 A1* | 1/2015 | Gebauer | G02B 6/0018 362/511 |
| 2017/0276316 A1* | 9/2017 | Kawabata | F21S 43/239 |
| 2017/0357041 A1* | 12/2017 | Onoda | G02B 6/0038 |

FOREIGN PATENT DOCUMENTS

| | | |
|---|---|---|
| CN | 201811155 U | 4/2011 |
| CN | 102721996 | 10/2012 |
| CN | 104251443 A | 12/2014 |
| CN | 105465738 A | 4/2016 |
| CN | 107490895 A | 12/2017 |

* cited by examiner

*Primary Examiner* — Evan P Dzierzynski
*Assistant Examiner* — Nathaniel J Lee
(74) *Attorney, Agent, or Firm* — Winston Hsu

(57) ABSTRACT

A light guiding device is applied to an indication apparatus with a lighting function. The light guiding device includes a light guiding component and a piercing hole structure. The light guiding component has an incident surface and an emergent surface. The piercing hole structure is disposed between the incident surface and the emergent surface. An inner wall of the piercing hole structure includes at least one arc surface portion and at least one plane surface portion. A light beam from the incident surface can be turned to a first angle via the arc surface portion, and the light beam can be turned to a second angle via the plane surface portion, so as to evenly project the light beam onto the emergent surface. A dimension of the emergent surface is greater than a dimension of the incident surface, and the first angle is greater than the second angle.

16 Claims, 4 Drawing Sheets

LIGHT GUIDING DEVICE AND INDICATION APPARATUS

BACKGROUND OF THE INVENTION

1. Field of the Invention

The present invention relates to a light guiding device and an indication apparatus with a light indicating function, and more particularly, to a light guiding device capable of uniformly projecting a light beam onto an elongated button and an indication apparatus with a light indicating function.

2. Description of the Prior Art

A conventional indication button can include a pressed keycap, a light guiding component, a lighting component and a circuit board. The lighting component is disposed on the circuit board and can receive energy and a control command from the circuit board. The light guiding component is disposed between the pressed keycap and the lighting component. When the pressed keycap is an elongated structure, a light beam emitted by the single lighting component cannot illuminate the whole pressed keycap, thus a second lighting component and a third lighting component can be respectively disposed on two sides of the light guiding component for illuminating the elongated pressed keycap. However, the conventional light guiding component cannot project light beams emitted by a plurality of lighting components uniformly onto the pressed keycap, which means the elongated pressed keycap may have an illuminated central area and dark lateral areas, so that the conventional indication button cannot provide preferred visual effect. Thus, design of a light guiding device capable of uniformly illuminating an elongated button is an important issue in the related mechanical industry.

SUMMARY OF THE INVENTION

The present invention provides a light guiding device capable of uniformly projecting a light beam onto an elongated button and an indication apparatus with a light indicating function for solving above drawbacks.

According to the claimed invention, a light guiding device includes a light guiding component and a piercing hole structure. The light guiding component has an incident surface and an emergent surface. The piercing hole structure is disposed between the incident surface and the emergent surface. An inner wall of the piercing hole structure includes at least one arc surface portion and at least one plane surface portion, and a light beam passing through the incident surface is partly transmitted to the emergent surface via the piercing hole structure. A dimension of the emergent surface is greater than a dimension of the incident surface.

According to the claimed invention, the light guiding device further includes a curved structure disposed on the incident surface for divergence of the light beam. The curved structure is a semi-elliptical concave structure. The light guiding component further has a reflective surface connected between the incident surface and the emergent surface. Two angles between the reflective surface and the incident surface and between the reflective surface and the emergent surface respectively are an obtuse angle and an acute angle. The light beam is turned via the arc surface portion and the plane surface portion, which resulted from refraction.

According to the claimed invention, an indication apparatus with a lighting function includes a lighting component and a light guiding device. The lighting component is adapted to emit a light beam. The light guiding device includes a light guiding component and a piercing hole structure. The light guiding component has an incident surface and an emergent surface. The piercing hole structure is disposed between the incident surface and the emergent surface. An inner wall of the piercing hole structure includes at least one arc surface portion and at least one plane surface portion, and a light beam passing through the incident surface is partly transmitted to the emergent surface via the piercing hole structure. A dimension of the emergent surface is greater than a dimension of the incident surface.

The light guiding device of the present invention preferably can be applied to the elongated indication apparatus. The indicating component of the indication apparatus can be the button or the reminder lamp. The dimension of the indicating component can be greater than the dimension of the lighting component, so that the light guiding device can be disposed between the indicating component and the lighting component for uniformly projecting the light beam emitted by the lighting component onto all areas of the indicating component. The lighting component can receive energy and a control command via a cable for decreasing hardware cost. The light beam emitted by the single lighting component can be uniformly projected onto the indicating component by the light guiding device; therefore, the present invention can decrease an amount of structural components and an assembly period. The light guiding device can be the trapezoid form having the incident surface smaller than the emergent surface and the reflective surface connected between the incident surface and the emergent surface. The light guiding device can dispose the curved structure on the incident surface, and dispose the piercing hole structure between the incident surface and the emergent surface, so as to change the transmission direction of the light beam entering the light guiding component, and to provide uniform illumination of the elongated indicating component.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
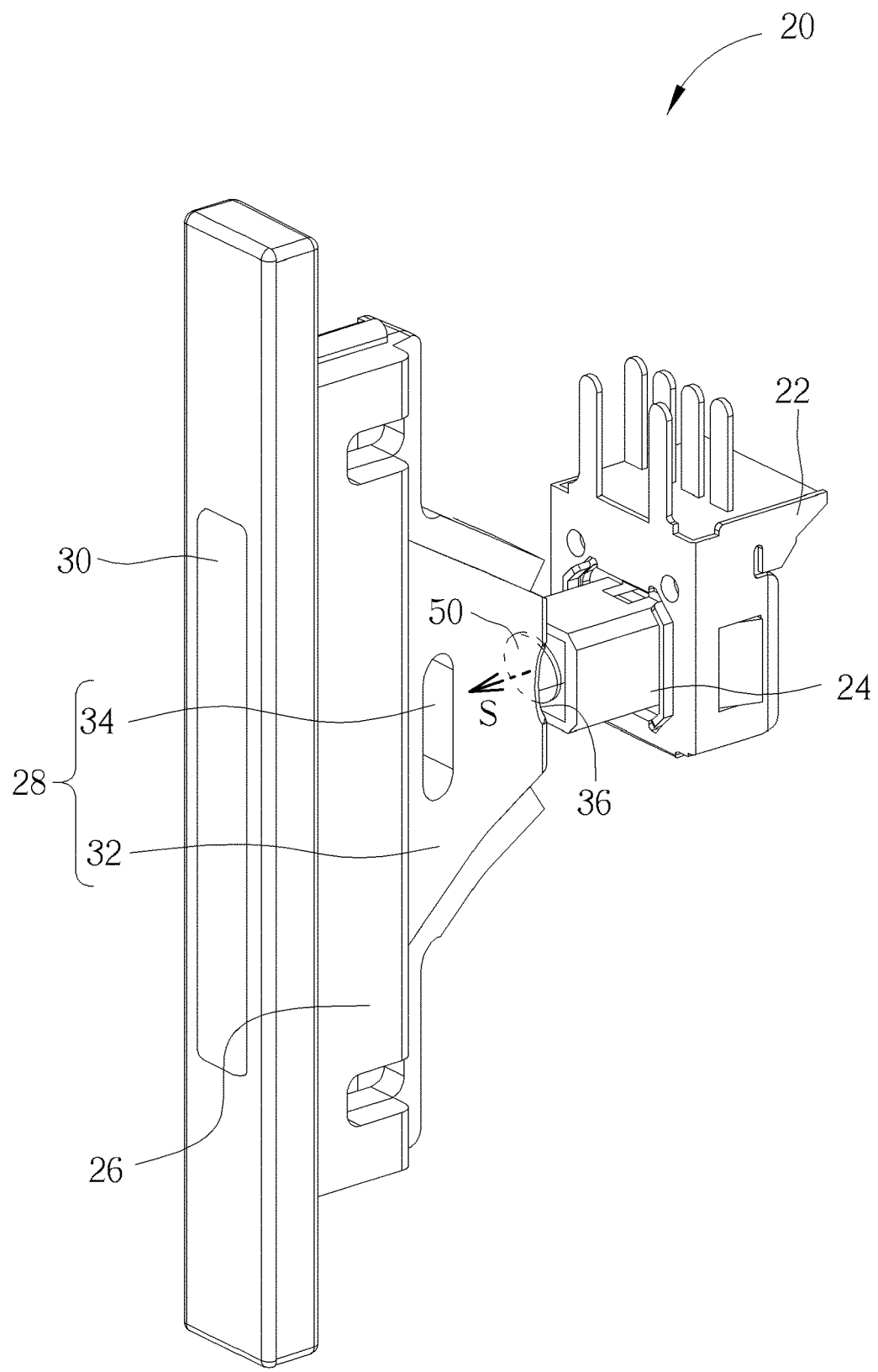
FIG. 1 is a schematic diagram of an indication apparatus according to an embodiment of the present invention.
Figure 2:
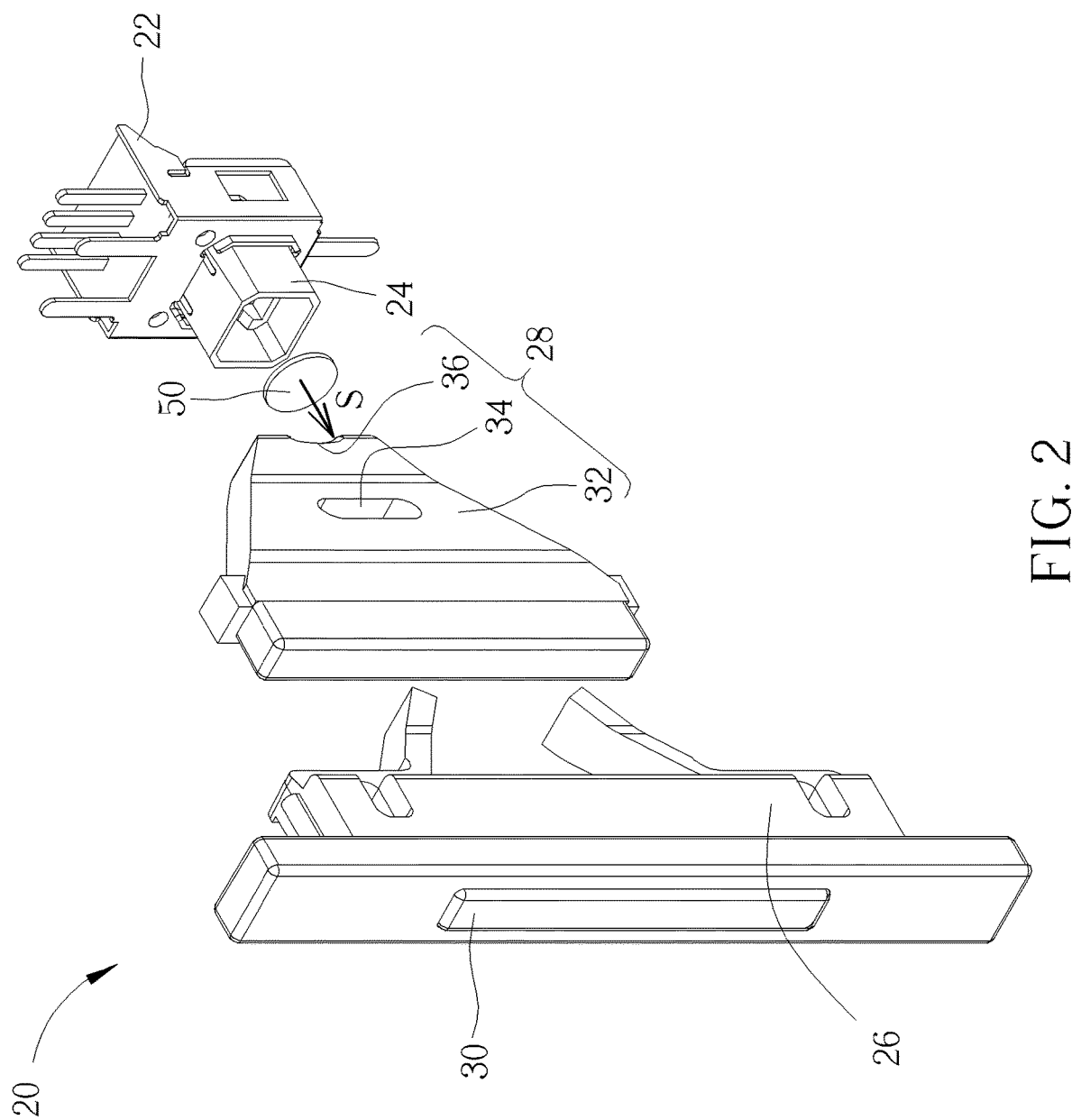
FIG. 2 is an exploded diagram of the indication apparatus according to the embodiment of the present invention.

Please refer to FIG. 1 and FIG. 2. FIG. 1 is a schematic diagram of an indication apparatus 20 according to an embodiment of the present invention. FIG. 2 is an exploded diagram of the indication apparatus according to the embodiment of the present invention. The indication apparatus 20 can include a base 22, a lighting component 24, a supporter 26, a light guiding device 28 and an indicating component 30. The lighting component 24 can be a light emitting diode or any kind of light source. The lighting component 24 can be disposed on the base 22 to emit a light beam S. The supporter 26 can be movably disposed on the base 22 and used to support the light guiding device 28 and the indicating component 30. The light guiding device 28 can be located between the lighting component 24 and the indicating component 30. The light guiding device 28 can align with the lighting component 24. The light beam S emitted by the lighting component 24 can be transmitted to the indicating component 30 via the light guiding device 28. The light guiding device 28 can guide the light beam S toward all areas on the indicating component 30, which means each unit area of the indicating component 30 can receive the same luminous flux so that illumination of the indicating component 30 can be uniform, to prevent illumination of an area on the indicating component 30 from being greater than illumination of another area on the indicating component 30. The indicating component 30 can be made of transparent material or semitransparent material. The indication apparatus 20 can be an operation panel of an electronic product, such as a server or a personal computer. The indicating component 30 can be a button or a reminder lamp on the operation panel, which depends on a design demand. A light divergent component 50 can be optionally disposed between the lighting component 24 and the light guiding device 28 for divergence of the light beam S.

Figure 3:
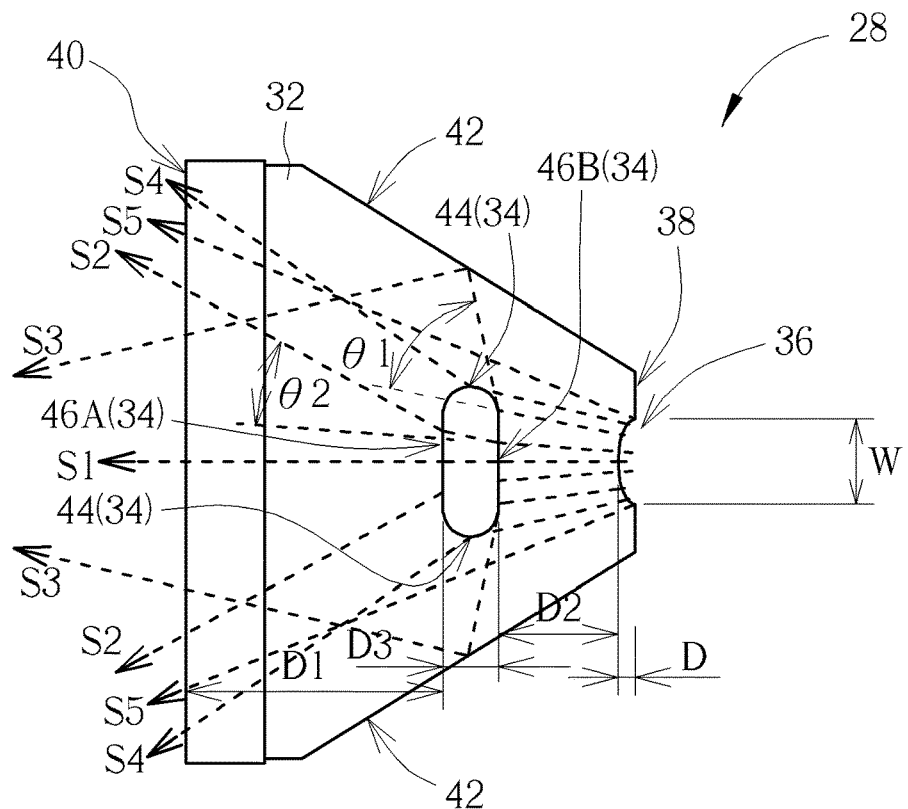
FIG. 3 is a diagram of a light guiding device according to a first embodiment of the present invention.

Please refer to FIG. 3. FIG. 3 is a diagram of the light guiding device 28 according to a first embodiment of the present invention. The light guiding device 28 can include a light guiding component 32, a piercing hole structure 34 and a curved structure 36. The piercing hole structure 34 can be disposed inside the light guiding component 32. The curved structure 36 can be disposed on an outer edge of the light guiding component 32. The piercing hole structure 34 and the curved structure 36 can be used to change a transmission direction of the light beam S. The light guiding component 32 can be a flat trapezoid form. The light guiding component 32 can include an incident surface 38, an emergent surface 40 and a reflective surface 42. The reflective surface 42 can be connected between the incident surface 38 and the emergent surface 40. An angle formed between the reflective surface 42 and the incident surface 38 can be an obtuse angle, and an angle formed between the reflective surface 42 and the emergent surface 40 can be an acute angle, which means the reflective surface 42 is the bevel edge of the trapezoid form and a dimension of the emergent surface 40 is greater than a dimension of the incident surface 38. The reflective surface 42 is slanted towards a center of the light guiding device 28 from the emergent surface 40 to the incident surface 38. An inner wall of the piercing hole structure 34 can have an arc surface portion 44 and a plane surface portion 46A. A distance between the arc surface portion 44 and the incident surface 38 can be smaller than a distance between the plane surface portion 46A and the incident surface 38, which means the arc surface portion 44 can be located between the incident surface 38 and the plane surface portion 46A. A distance between the plane surface portion 46A and the emergent surface 40 can be smaller than a distance between the arc surface portion 44 and the emergent surface 40, which means the plane surface portion 46A can be located between the arc surface portion 44 and the emergent surface 40.

In the first embodiment, the piercing hole structure 34 can include two arc surface portions 44 and two plane surface portions 46A and 46B. The two arc surface portions 44 and the two plane surface portions 46A and 46B are connected to each other. Two ends of each arc surface portion 44 can be respectively connected to the plane surface portions 46A and 46B. Apart of the light beam S can directly pass through the piercing hole structure 34 to be projected onto the emergent surface 40. The light beam S passing the arc surface portion 44 can be turned to a first angle θ1. The light beam S passing the plane surface portions 46A and 46B can be turned to a second angle θ2. The first angle θ1 may be greater than the second angle θ2, however an actual application is not limited to the above-mentioned embodiment. The arc surface portions 44 and the plane surface portions 46A and 46B can turn the light beam S via refraction. Besides, the arc surface portion 44 further can turn the light beam S via total reflection. The arc surface portion 44 can be a semicircular form. The present invention may have the arc surface portion 44 with a continuous arc surface structure, which means a curvature of the arc surface portion 44 is a single value. Further, the arc surface portion 44 may be made by a plurality micro arc surface structures respectively having different curvatures, which means the arc surface portion 44 is a discontinuous arc surface structure (not shown in figures).

As the dimension of the emergent surface 40 is greater than the dimension of the incident surface 38, the light guiding device 28 can include the curved structure 36 formed on the incident surface 38. The curved structure 36 can be used to diverge the light beam S for a start, and then the piercing hole structure 34 can be used to further turn the transmission direction of the light beam S. In the preferred embodiment of the present invention, the curved structure 36 can be a semi-elliptical concave structure, and an actual application is not limited to the above-mentioned embodiment. The curved structure 36 can have a depth D and a width W. The width W can be six times to eight times of the depth D; for example, the width W can be ranged between 1.8-2.5 mm, and the depth D can be ranged between 0.2-0.4 mm. A first distance D1 between the plane surface portion 46A and the emergent surface 42 can be two times of a second distance D2 between the plane surface portion 46B and the curved structure 36, and a third distance D3 between the plane surface portion 46A and the plane surface portion 46B can be forty percent of the second distance D2. A ratio between the above-mentioned distances may have ten percentage of error. The curved structure 36 is an optional structural design. The present invention can optionally include the curved structure 36, or optionally design a dimension and/or a position of the curved structure 36. The light guiding device 28 may only have the piercing hole structure 34 disposed inside the light guiding component 32 and the incident surface 38 of the light guiding component 32 is flat, which means the incident surface 38 does not have the curved structure.

As shown in FIG. 3, the light beam S1 in the middle can pass through the curved structure 36 and be projected onto the emergent surface 40 via the piercing hole structure 34, so that the transmission direction of the light beam S1 can be nearly straight. The light beam S2 located by sides of the central light beam S1 can be turned when passing the curved structure 36, and further can be turned to the second angle θ2 when passing through the plane surface portions 46A and 46B of the piercing hole structure 34, so as to project onto an edge of the emergent surface 40. The light beam S3 located on outer sides of the light beam S2 can be turned via the curved structure 36, and further turned to the first angle θ1 by the arc surface portion 44 of the piercing hole structure 34, and then be projected onto the emergent surface 40 due to reflection of the reflective surface 42. The light beam S4 can be turned by passing through the arc surface portion 44 of the piercing hole structure 34 and projected onto the outer edge of the emergent surface 40. The light beam S5 does not pass through the piercing hole structure 34 but directly passes through the light guiding component 32 to be projected onto the emergent surface 40. Therefore, the central area and the lateral area of the emergent surface 40 can be projected by the light beams S1, S2, S3, S4 and S5 for uniform illumination.

Figure 4:
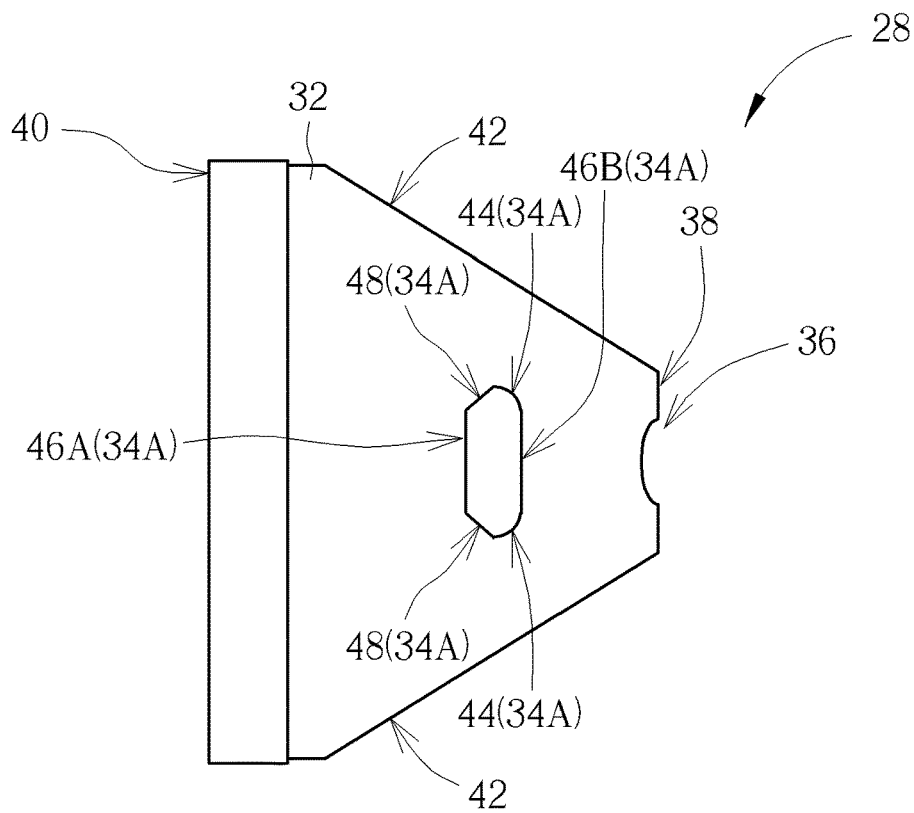
FIG. 4 is a diagram of the light guiding device according to a second embodiment of the present invention.

Please refer to FIG. 4. FIG. 4 is a diagram of the light guiding device 28 according to a second embodiment of the present invention. The arc surface portion 44 of the piercing hole structure 34A of the light guiding device 28 can be located between the incident surface 38 and the plane surface portion 46A. An end of the arc surface portion 44 can be directly connected to the plane surface portion 46B, and the other end of the arc surface portion 44 can be connected to the plane surface portion 46A via the lateral surface portion 48. The lateral surface portion 48 is an optional structure used to change the transmission direction of the light beam S. The lateral surface portion 48 can be a plane-shaped surface design, an arc-shaped surface design, or a combination of the plane-shaped surface design and the arc-shaped surface design. The second embodiment of the present invention can dispose the planar lateral surface portion 48 on a side of the arc surface portion 44 adjacent to the emergent surface 40. The light beam S which passes through the planar lateral surface portion 48 may be not turned or turned to a small angle. The present invention can change a dimension of the planar lateral surface portion 48, or an angle of the planar lateral surface portion 48 relative to the plane surface portion 46A for an aim of achieving uniform illumination of the emergent surface 40.

Figure 5:
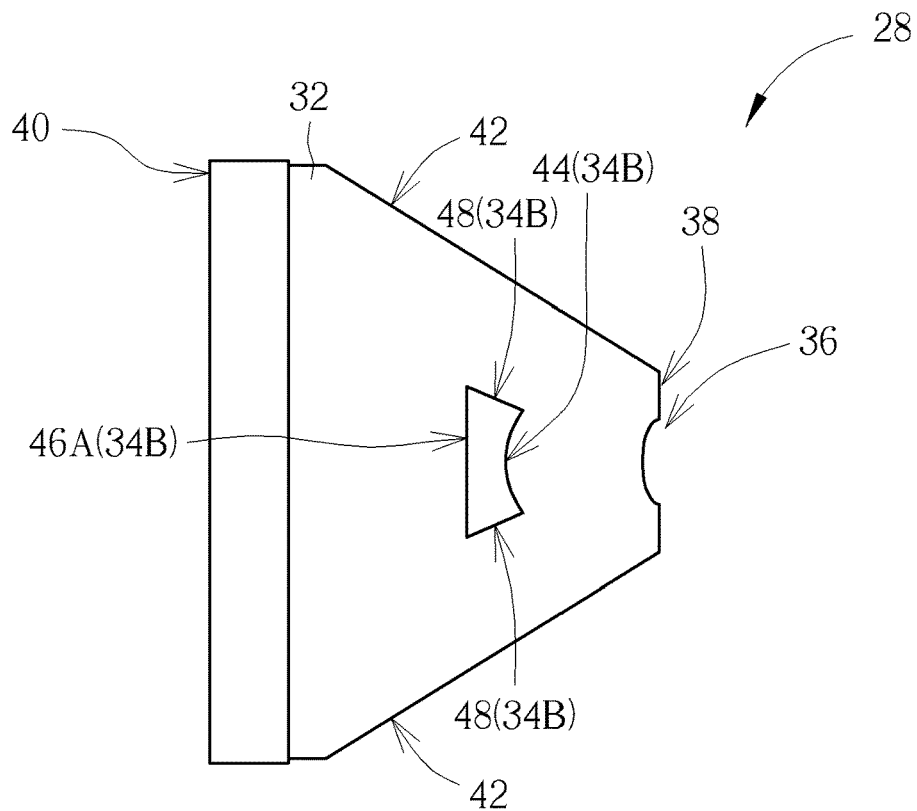
FIG. 5 is a diagram of the light guiding device according to a third embodiment of the present invention.

Please refer to FIG. 5. FIG. 5 is a diagram of the light guiding device 28 according to a third embodiment of the present invention. The arc surface portion 44 of the piercing hole structure 34B in the third embodiment can be located between the incident surface 38 and the plane surface portion 46A. The planar lateral surface portion 48 can be connected between the arc surface portion 44 and the plane surface portion 46A. In the first embodiment and the second embodiment, the arc surface portion 44 can be located on the lateral side of the piercing hole structures 34 and 34A for changing the transmission direction of some part of the light beam S. In the third embodiment, the light beam S can pass through the curved structure 36 and be diverged by the arc surface portion 44, so that the light beam S passing through the arc surface portion 44 can be projected onto the emergent surface 40 via the plane surface portion 46A and the lateral surface portion 48 due to refraction and total reflection.

Figure 6:
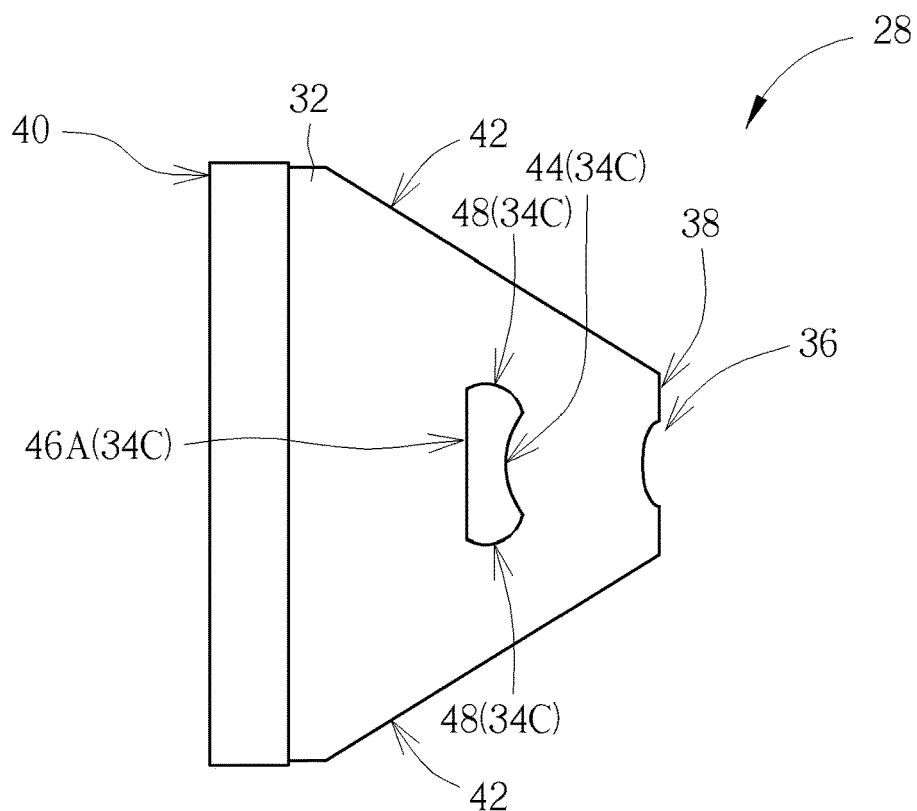
FIG. 6 is a diagram of the light guiding device according to a fourth embodiment of the present invention.

Please refer to FIG. 6. FIG. 6 is a diagram of the light guiding device 28 according to a fourth embodiment of the present invention. The arc surface portion 44 of the piercing hole structure 34C in the fourth embodiment can be located between the incident surface 38 and the plane surface portion 46A. The arc-typed lateral surface portion 48 can be connected between the arc surface portion 44 and the plane surface portion 46A. In the fourth embodiment, the light beam S which passes through the curved structure 36 can be diverged by the arc surface portion 44, and the light beam S passing through the arc surface portion 44 can be uniformly projected onto the emergent surface 40 via the plane surface portion 46A and the lateral surface portion 48 because of refraction and total reflection.

In conclusion, the light guiding device of the present invention preferably can be applied to the elongated indication apparatus. The indicating component of the indication apparatus can be the button or the reminder lamp. The dimension of the indicating component can be greater than the dimension of the lighting component, so that the light guiding device can be disposed between the indicating component and the lighting component for uniformly projecting the light beam emitted by the lighting component onto all areas of the indicating component. The lighting component can receive energy and a control command via a cable for decreasing hardware cost. The light beam emitted by the single lighting component can be uniformly projected onto the indicating component by the light guiding device; therefore, the present invention can decrease an amount of structural components and an assembly period. The light guiding device can be the trapezoid form having the incident surface smaller than the emergent surface and the reflective surface connected between the incident surface and the emergent surface. The light guiding device can dispose the curved structure on the incident surface, and dispose the piercing hole structure between the incident surface and the emergent surface, so as to change the transmission direction of the light beam entering the light guiding component, and to provide uniform illumination of the elongated indicating component.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A light guiding device, comprising:
a light guiding component, having an incident surface and an emergent surface, the emergent surface having a long-strap form with two opposite ends; and
a piercing hole structure disposed between the incident surface and the emergent surface, an inner wall of the piercing hole structure being a smooth surface divided into two arc surface portions and two plane surface portions, each of the two plane surface portions is a flat surface, the two plane surface portions being parallel to each other and having the same length, the two arc surface portions being outwardly convex surfaces of some parts of the piercing hole structure for reflecting light toward a reflective surface and the emergent surface of the light guiding component, light passing through the incident surface being partly to the emergent surface via the piercing hole structure;
wherein a dimension of the emergent surface is greater than a dimension of the incident surface, and a normal vector of the emergent surface is parallel to a normal vector of the plane surface portion;
wherein a first distance between the emergent surface and the plane surface portion close to the emergent surface is greater than a second distance between the curved structure and the plane surface portion close to the curved structure, and the second distance is greater than a third distance between the two plane surface portions.
2. The light guiding device of claim 1, further comprising:
a curved structure disposed on the incident surface.
3. The light guiding device of claim 2, wherein the curved structure is a semi-elliptical concave structure.

4. The light guiding device of claim 2, wherein one of the two arc surface portions is connected to the plane surface portions, a first distance between one of the plane surface portions and the emergent surface is greater than a second distance between one of the plane surface portions and the curved structure.

5. The light guiding device of claim 1, wherein the light guiding component further has at least one reflective surface connected between the incident surface and the emergent surface.

6. The light guiding device of claim 1, wherein the two arc surface portions and the two plane surface portions are alternately arranged.

7. The light guiding device of claim 1, wherein the light guiding component is a flat trapezoid form.

8. An indication apparatus, comprising:
a lighting component adapted to emit light; and
a light guiding device, comprising:
   a light guiding component, having an incident surface and an emergent surface, the emergent surface having a long-strap form with two opposite ends; and
   a piercing hole structure disposed between the incident surface and the emergent surface, an inner wall of the piercing hole structure being a smooth surface divided into two arc surface portions and two plane surface portions, each of the two plane surface portions is a flat surface, the two plane surface portions being parallel to each other and having the same length, the two arc surface portions being outwardly convex surfaces of some parts of the piercing hole structure for reflecting light only toward a reflective surface and the emergent surface of the light guiding component, the light passing through the incident surface being partly to the emergent surface via the piercing hole structure;
wherein a dimension of the emergent surface is greater than a dimension of the incident surface, and a normal vector of the emergent surface is parallel to a normal vector of the plane surface portion;
wherein a first distance between the emergent surface and the plane surface portion close to the emergent surface is greater than a second distance between the curved structure and the plane surface portion close to the curved structure, and the second distance is greater than a third distance between the two plane surface portions.

9. The indication apparatus of claim 8, further comprising:
a light divergent component disposed between the lighting component and the light guiding device.

10. The indication apparatus of claim 8, wherein the light guiding device further comprises a curved structure disposed on the incident surface and adapted to diverge the light.

11. The indication apparatus of claim 10, wherein the curved structure is a semi-elliptical concave structure.

12. The indication apparatus of claim 10, wherein one of the two arc surface portions is connected to the plane surface portions, a first distance between one of the plane surface portions and the emergent surface is greater than a second distance between one of the plane surface portions and the curved structure.

13. The indication apparatus of claim 8, wherein the light guiding component further has at least one reflective surface connected between the incident surface and the emergent surface.

14. The indication apparatus of claim 8, wherein the two arc surface portions and the two plane surface portions are alternately arranged.

15. The indication apparatus of claim 8, wherein the light guiding component is a flat trapezoid form.

16. The indication apparatus of claim 8, wherein the light guiding device comprises the light guiding component, the piercing hole structure and a curved structure, the light guiding component has the incident surface, the emergent surface and the reflective surface, the reflective surface is connected between the incident surface and the emergent surface, two angles between the reflective surface and the incident surface and between the reflective surface and the emergent surface respectively are an acute angle and an obtuse angle, the piercing hole structure is disposed between the incident surface and the emergent surface, the inner wall of the piercing hole structure comprises a lateral surface portion connected between one of the two plane surface portions and one of the two arc surface portions so that the light is projected onto the emergent surface and the curved structure is disposed on the incident surface of the light guiding component.

* * * * *